(12) United States Patent
Dunko

(10) Patent No.: US 8,170,222 B2
(45) Date of Patent: May 1, 2012

(54) AUGMENTED REALITY ENHANCED AUDIO

(75) Inventor: Gregory A. Dunko, Cary, NC (US)

(73) Assignee: Sony Mobile Communications AB, Lund (SE)

( * ) Notice: Subject to any disclaimer, the term of this patent is extended or adjusted under 35 U.S.C. 154(b) by 965 days.

(21) Appl. No.: 12/105,367

(22) Filed: Apr. 18, 2008

(65) Prior Publication Data

US 2009/0262946 A1 Oct. 22, 2009

(51) Int. Cl.
*H04R 5/00* (2006.01)
(52) U.S. Cl. ............... 381/58; 381/74; 381/19; 381/91; 381/17; 381/310
(58) Field of Classification Search .................... 381/58, 381/74, 19, 91, 17, 310
See application file for complete search history.

(56) References Cited

U.S. PATENT DOCUMENTS

| | | | |
|---|---|---|---|
| 6,021,206 A | 2/2000 | McGrath | |
| 6,766,028 B1 | 7/2004 | Dickens | |
| 7,732,694 B2 * | 6/2010 | Rosenberg | 84/611 |
| 7,812,815 B2 * | 10/2010 | Banerjee et al. | 345/156 |
| 7,822,607 B2 * | 10/2010 | Aoki et al. | 704/270 |
| 2004/0030491 A1 | 2/2004 | Hull | |
| 2004/0156512 A1 | 8/2004 | Parker | |
| 2006/0277474 A1 * | 12/2006 | Robarts et al. | 715/745 |
| 2009/0013052 A1 * | 1/2009 | Robarts et al. | 709/206 |
| 2009/0231413 A1 * | 9/2009 | Dunko | 348/14.08 |
| 2011/0124204 A1 * | 5/2011 | Ota et al. | 438/787 |

FOREIGN PATENT DOCUMENTS

WO 01/55833 8/2001

OTHER PUBLICATIONS

Bolter et al. "Is it Live or is it AR?" http://www.spectrum.ieee.org/print/5377.
International Search Report, corresponding to International Patent Application No. PCT/US2008/080104, dated Feb. 4, 2009.
Written Opinion, corresponding to International Patent Application No. PCT/US2008/080104, dated Feb. 4, 2009.
International Preliminary Report on Patentability; Jul. 19, 2010; issued in International Patent Application No. PCT/US08/80104.
State Intellectual Property Office, P.R. China; First Office Action; Dec. 7, 2011; issued in Chinese Patent Application No. 200880128592.8.

* cited by examiner

*Primary Examiner* — A O Williams
(74) *Attorney, Agent, or Firm* — Sreenivas Vedantam; Moore & Van Allen, PLLC

(57) ABSTRACT

A device and method for providing augmented reality enhanced audio. The device is portable and may include a location processing module capable of receiving location information and determining a location of the device in an environment, an orientation processing module capable of determining an orientation of the device at the location, a processor capable of modifying audio content based on the location of the device in the environment and the orientation of the device at the location, and an audio output device capable of outputting the modified audio content. The orientation of the device includes an azimuth and an elevation of the device.

20 Claims, 5 Drawing Sheets

AUGMENTED REALITY ENHANCED AUDIO

BACKGROUND OF THE INVENTION

The present invention is related to telephony, and more specifically to augmented reality enhanced telephony.

Augmented reality includes the real world being enhanced with virtual video or audio. A person in the real world may not only see the real world objects but also see generated virtual objects as existing in the real world. Further, sounds may be added to an environment in the real world to further enhance the person's experience in the environment. Currently, sounds heard by a person in an augmented reality (AR) environment do not vary based on the person's location in the environment.

The prior art discloses devices which determine the position of a person or a person's head. For example, in PCT Publication Number WO 01/55833, a device is disclosed that determines a position of a headset when worn by a person so that the device knows where the person's head is pointed at any given time. Additionally, in U.S. Patent Application Publication No. 2004/0156512, a surround-sound system obtains the position of a user based on a received scattering response to outputted electromagnetic signals (i.e., pulsed infrared signals, RF signals, etc.). Yet, each of the above-mentioned references can determine only a position of a person or a person's head and do not allow for determining the position of a hand-held device in possession of a person so as to further enhance the person's augmented reality experience.

BRIEF SUMMARY OF THE INVENTION

According to one aspect of the present invention, a method for augmented reality enhanced audio that includes obtaining audio content by a device, modifying the audio content by the device, the audio content being modified based on a location of the device in an environment and an orientation of the device at the location, and outputting the modified audio content by the device.

According to another aspect of the present invention, a device for augmented reality enhanced audio that includes a location processing module, the location processing module being capable of receiving location information and determining a location of the device in an environment, an orientation processing module, the orientation processing module being capable of determining an orientation of the device at the location, a processor, the processor being capable of modifying audio content based on the location of the device in the environment and the orientation of the device at the location, and an audio output device, the audio output device being capable of outputting the modified audio content.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
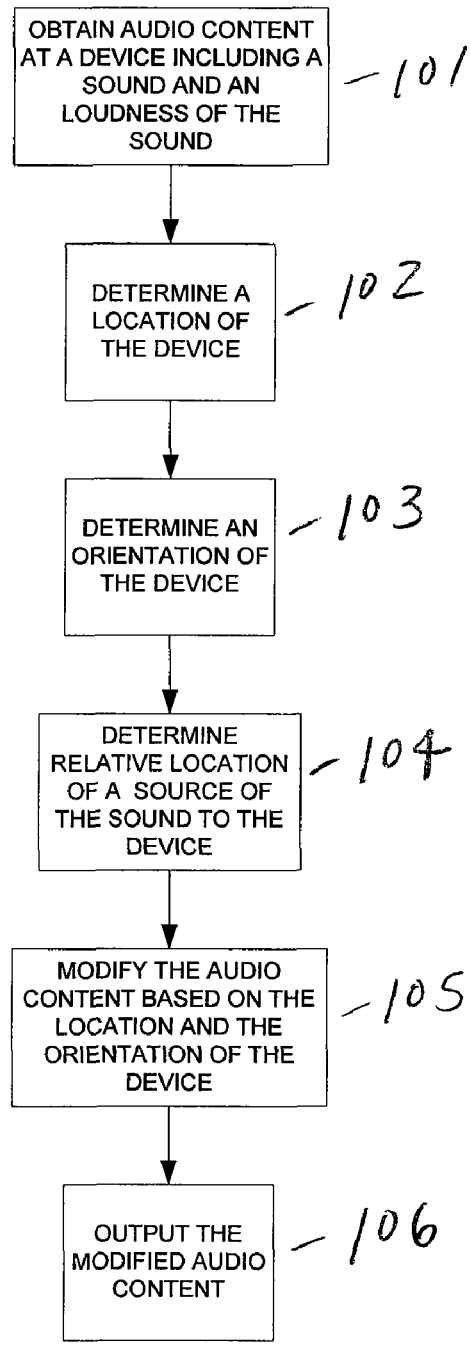
FIG. 1 is a process for augmented reality enhanced audio according to an exemplary embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention, audio aspects of a user's augmented reality (AR) experience are improved by taking into account a user's specific location, proximity to a sound source, and orientation/direction with respect to the sound source. These parameters may be considered in modifying sound characteristics (loudness, surround sound, etc. . . . ) that a user may hear.

According to embodiments of the present invention, an AR rendering device may use a location of a sound source, a sound pressure level (SPL), e.g., loudness, of the sound emitted by the sound source, and a location of a user holding the AR rendering device relative to the sound source to adjust the sound from the sound source being outputted by the AR rendering device and heard by the user. For example, the loudness may be adjusted based on the proximity of the user to the sound source and the left/right (LR) balance or surround sound "balance" may be adjusted based upon an orientation/direction that the AR rendering device may be facing. Therefore, according to embodiments of the present invention, depending on a location and an orientation of a user's AR rendering device in an environment, sounds may be modified to denote to the user a direction of a sound source emitting the sound as well as a distance of the user from the sound source.

A user carries a portable AR rendering device that is capable of outputting audio for listening to the user as well as processing audio content containing the audio based on a location of the device (i.e., user) relative to sources of sound. The AR rendering device has augmented reality generation capability, the capability to determine physical location and distance from a defined location, and the capability to determine orientation/direction (i.e., which direction device is facing). Further, the AR rendering device may have the capability to analyze augmented reality provided audio for source location/sound level descriptors and if available, assess current environment for proximity to sound source location and direction. The AR rendering device may adjust rendering of audio content using the proximity and orientation information and render the modified audio content for listening to the user.

Further, a user may use the portable AR rendering device to play audio content available at an environment that the user is located. For example, a user may enter a museum or historic battlefield that provides augmented reality audio content for listening by the user on the user's AR rendering device while walking through the museum. In this regard, the audio content may be streamed to the user's device or the user may load or download the audio content associated with the museum. As the user carries the AR rendering device through the museum, the device may process the audio content based on a location of the user in the museum as well as an orientation of the device at the location. The orientation of the device may relate to an azimuth, an elevation, and a tilt of the device (or in airplane terms, roll, pitch, and yaw).

Sounds from the augmented reality may be modified in loudness and direction depending on a relative location of the user and the AR rendering device from the source of the sound. Further, in embodiments according to the present invention, the user may be allowed to modify sound content associated with an environment by either adding or deleting sound sources, editing locations of sound sources, editing a loudness of sound sources, etc. The audio content may include a sound and a max loudness of the sound. The audio content may exist in the form of a portable storage media (e.g., diskette, CD, etc.) that may be loaded into the AR rendering device of the user. Moreover, in embodiments according to the present invention, AR audio content may be pre-stored on the AR rendering device of the user where the AR audio content is played either upon selection by the user, or dependent on a location of the AR rendering device in an environment.

In addition, according to embodiments of the present invention, sounds and sound sources associated with a particular environment may be automatically scaled to a new environment when the AR device of the user is located in the new environment. The AR device may perform the scaling or the scaling may performed external to the AR device. For example, if AR content is associated with a staged battlefield environment that the AR device is currently located in, should the AR device be moved to a different environment (e.g., grocery store), the sound sources and their locations relative to each other as defined in association with the battlefield may automatically be scaled to the grocery store environment. In this regard, the sound sources and their locations relative to each other, the dimensions of the battlefield environment, and the dimensions of the grocery store environment may be used to perform the scaling.

Moreover, according to embodiments of the present invention, an AR device may receive or obtain audio content in any of many various ways such as, for example, from storage located on the AR device, from streamed audio content sent to the AR device, from content paid for and downloaded, from audio content sent over the air from a server, etc. Further, an AR device according to embodiments of the present invention, may receive location information from a GPS system, a positioning system, a triangulation system, a system located at the location the device is located, etc.

Further, according to embodiments of the present invention, a map of sound sources may be overlaid onto an existing environment. Upon entering the environment, the AR device may play augmented reality versions of the sounds being emitted from the sound sources. As noted previously, the AR device may receive audio content that includes the sounds, a loudness of the sounds, and may also include sources of the sounds, the locations of the sources in the environment, or physical dimensions of the environment. For example, a user could "map out" a course of sounds\sound effects in an own environment, such that as the user traverses this own environment, his audio experience is enhanced.

FIG. 1 shows a process for augmented reality enhanced audio according to an exemplary embodiment of the present invention. In the process 100, in block 101, audio content may be obtained at a device where the audio content includes a sound and a loudness of the sound. The audio content may contain more than one sound and associated loudness sound. In block 102, a location of the device may be determined. In block 103, an orientation of the device may be determined. In block 104 the relative location of a source of the sound to the device may be determined. In block 105, the audio content may be modified based on the location and the orientation of the device and the relative location of the source of the sound. In block 106, the device may output the modified audio content (i.e., augmented reality enhanced audio).

Figure 2:
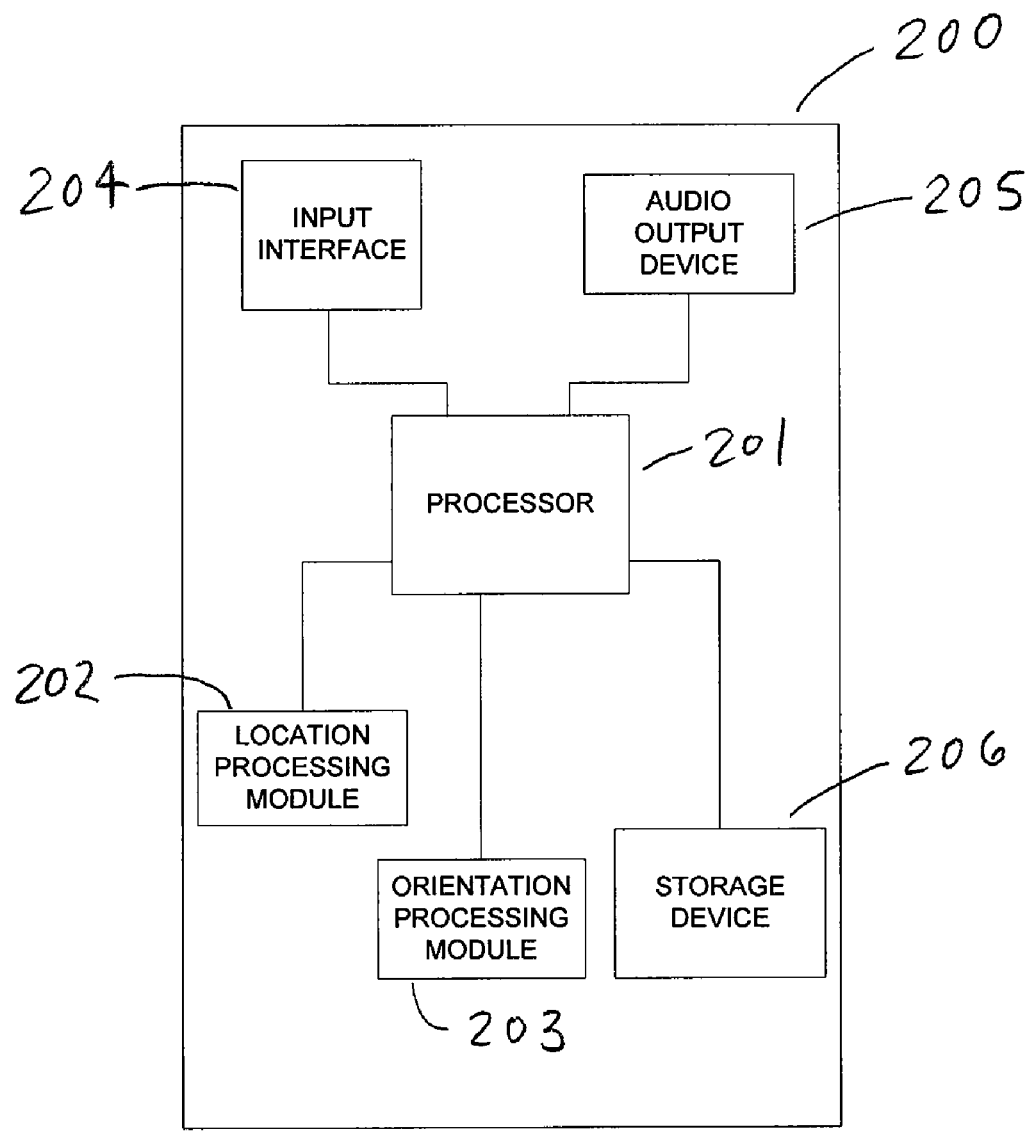
FIG. 2 is a diagram of a device for augmented reality enhanced audio according to an exemplary embodiment of the present invention.

FIG. 2 shows a diagram of a device for augmented reality enhanced audio according to an exemplary embodiment of the present invention. The device 200 may include a processor 201 that may be interconnected to a location processing module 202, and orientation processing module 203, an input interface 204, an audio output device 205, and a storage device 206. The location processing module 202 may be capable of receiving location information and determining a location of the device 200 in an environment. The orientation processing module 203 may be capable of determining an orientation of the device 200 at the location in the environment. The audio output device 205 may be capable of outputting audio modified by the processor 201 for listening by a user of the device 200. The input interface 204 may be capable of receiving audio content that may contain one or more sounds and SPL data associated with each one or more sound. The storage device 206 may be capable of storing audio content. The processor 201 may be capable of modifying audio content based on the location of the device 200 in an environment, the relative location of the sound source in the environment, and the orientation of the device 200 at the location.

The device 200 may be any type of portable device such as for example, a mobile phone, a computer, a personal digital assistant (PDA), an electronic game, an audio device, etc. The audio output device 205 may be any type of audio output device such as, for example, a headset, earplugs, one or more speakers, etc. The location processing module 202 may receive any type of location information such as, for example, GPS coordinates of the location of the device 200 from a GPS system, a distance of the device 200 from each sound source in an environment, position information of the device 200 from a positioning system, triangulation information of the device 200 from a triangulation system, etc. The location processing module 202 and the orientation processing module 203 may be in the form of software stored in the storage device 206 or in the processor 201. Further, location processing module 202 and orientation processing module 203 may be hardware functions, or a mix of software and hardware. In addition, software, hardware, or a combination thereof, may be used to implement the location processing module 202 integrated with the orientation processing module 203.

Figure 3:
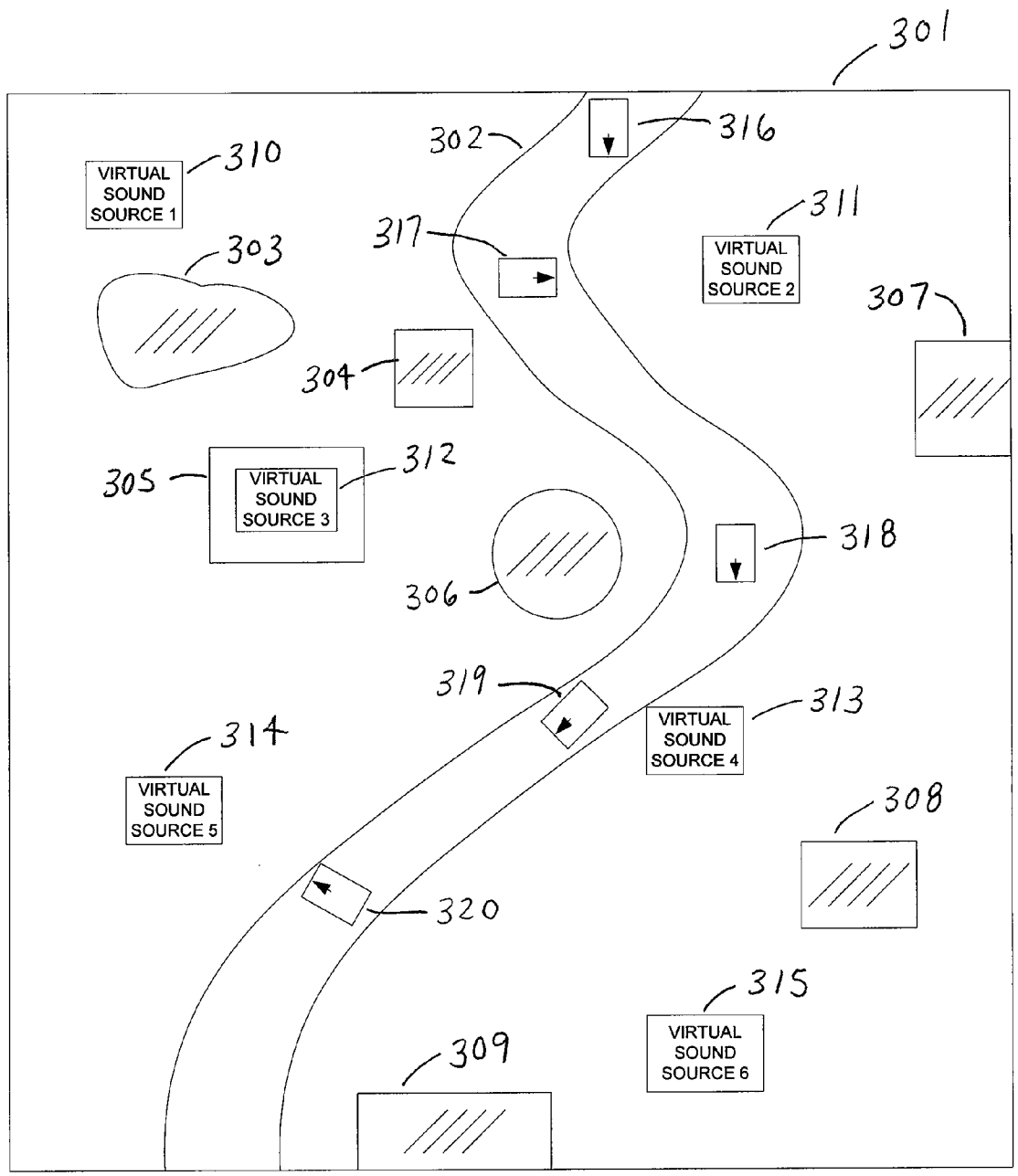
FIG. 3 is a diagram illustrating operation of an AR device in an environment according to an exemplary embodiment of the present invention.

FIG. 3 shows a diagram illustrating operation of an AR device in an environment according to an exemplary embodiment of the present invention. An environment 301 is shown where the environment 301 in this exemplary embodiment may be a section (e.g., a room) of the real world. The environment 301 in this example embodiment includes a path 302 that winds through the environment 301. The real world environment 301 may include a plurality of real world objects 303-309 that may be any type of object, person, thing, etc. that may exist in the real world such as, for example, furniture, fixtures, trees, buildings, vehicles, appliances, household items, etc. To help illustrate embodiments of the present invention, these real world objects 303-309 are shown as simple shapes with diagonal lines. The real world objects 303-309 may be stationary objects, movable objects, or moving objects. For example, the sound experience may start when a user enters an environment and the sound sources may be "moving" with time. It is also possible for a user to be stationary in this environment and for the sound to be apparently moving to a user's ear.

A user may enter the environment 301 carrying a portable augmented reality (AR) rendering device. As the user enters the environment 301, the user may travel along the path 302 carrying the AR device where the AR device may travels through different locations and orientations 316-320 as the user travels along the path 302. Further, the environment 301 may be overlaid with one or more virtual sound sources 310-315 that may appear to be located in various locations in the environment 301. Each virtual sound source 310-315 may have associated sound content that includes a sound and an associated loudness. As shown in this example embodiment, a sound source (e.g., sound source 3, 312) may be overlaid on a real world object (e.g., object 305) where a sound from the sound source 312 may appear as being emitted from the real world object 305.

To help illustrate embodiments according to the present invention, an AR device is shown with an arrow to denote an orientation of the device. An orientation of an AR device may include an azimuth, an elevation, and a tilt. In this illustration, only the azimuth portion of the orientation is shown here. When the AR device is in a first location/orientation position 316, the AR device may receive audio content from a sound source 1, 310 and a sound source 2, 311. The AR device may receive location information denoting where in the environment 301 the AR device is located. The AR device at the first location/orientation position 316 may use this location information and the orientation of the AR device to modify the audio content received from the sound source 1, 310 and the sound source 2, 311. The audio content from the sound source 1, 310 may be modified to reflect a lower sound volume and a sound that appears to be coming from the right side of the AR device based on the first location/orientation position 316 of the AR device. Further, audio content from the sound source 2, 311 may be modified such that the volume of the sound is a medium level and such that the direction of the sound from sound source 2, 311 appears to come from in front of and to the left of the first location/orientation position 316 of the AR device.

Similarly, when the AR device is at a second location/orientation position 317, the sound source 1, 310 may appear faint and appear to be coming from behind the AR device while the sound source 2, 311 may sound loud and appear to be in front of the AR device. Further, when the AR device is at a third location/orientation position 318, the sound source 2, 311 may appear faint and to be coming from the rear of the AR device, a sound source 3, 312 may appear to be of a stronger sound volume and coming from the right of the AR device, and a sound source 4, 313 may have a sound volume louder than the other two sound sources and may appear to be coming from in front of the AR device. When the AR device is at a fourth location/orientation position 319, the sound source 4, 313 may appear extremely loud and be coming from the left rear side of the AR device while the sound source 3, 312 may appear faint and coming from the right side of the AR device. When the AR device is in a fifth location/orientation position 320, a sound source 5, 314 may appear fairly loud and coming from a direction in front of the AR device, while a sound source 6, 315 may appear faint and coming from the rear of the AR device. Therefore, according to embodiments of the present invention, an AR device may modify audio content received related to one or more sound sources in an environment where the audio content may be modified based on a location/orientation of the AR device relative to each sound source in the environment. The number of sound sources and AR device positions/orientations shown in this exemplary embodiment are for illustrative purposes and do not limit the scope of embodiments according to the present invention.

Figure 4:
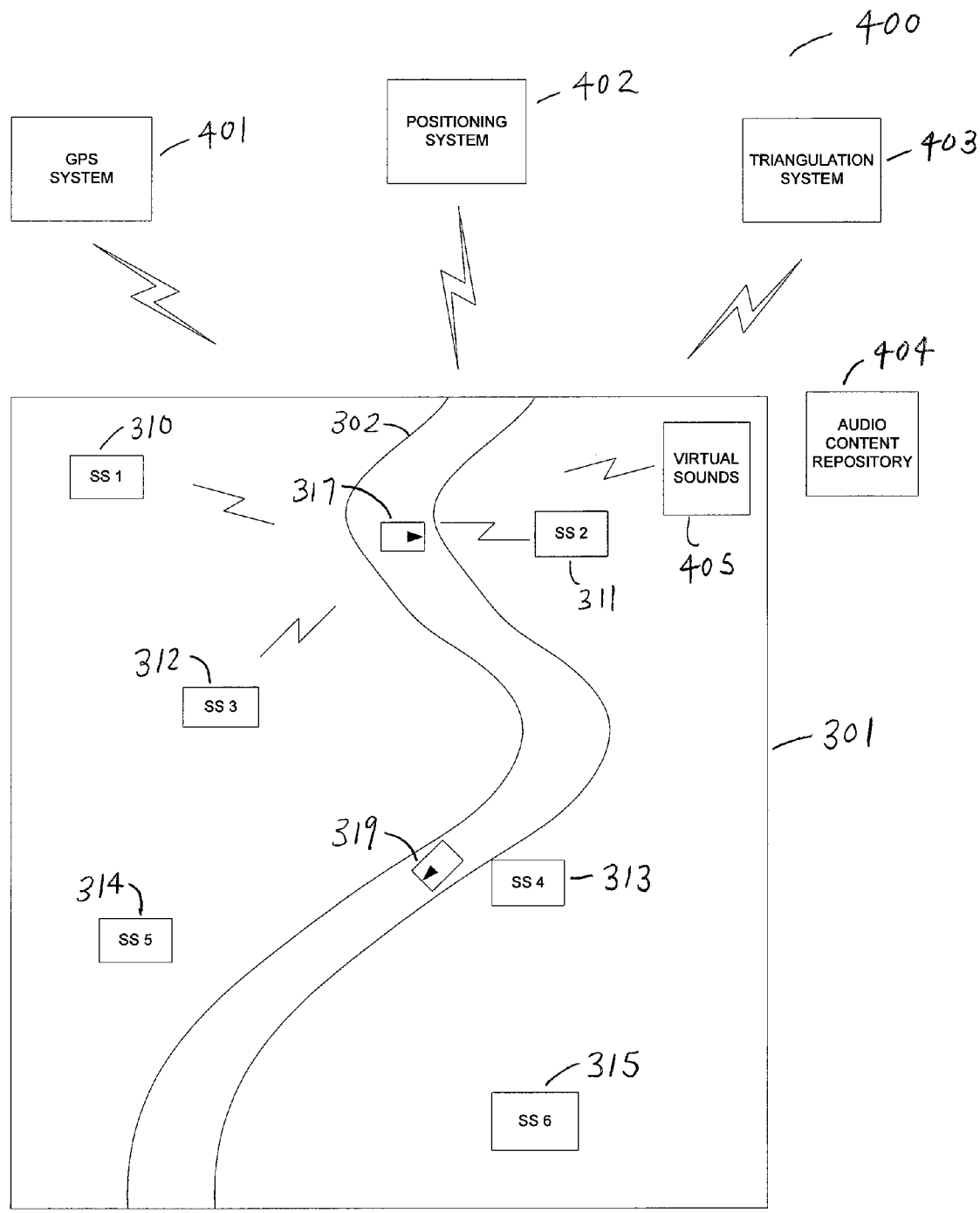
FIG. 4 is a system for receiving location information according to an exemplary embodiment of the present invention.

FIG. 4 shows a system for receiving location information according to an exemplary embodiment of the present invention. In the system 400, an environment 301 in the real world may include an AR device at a specific location/orientation position 317 in the environment 301. The AR device at the location/orientation position 317 may receive location information from any of a variety of sources or ways. For example, the AR device may receive location information from a GPS system 401, a positioning system 402, or a triangulation system 403. In addition, audio content may be purchased or otherwise obtained from an audio content repository 404 and stored and/or processed in the AR device. Moreover, according to embodiments of the present invention, an AR device may receive audio content from each individual audio content source 310-315, or may receive it from a central source 405 that provides audio content for all audio sources in the environment 301. In addition, audio content associated with audio content sources 310-315 in the environment 301 may be pre-stored or otherwise stored in the AR device.

Figure 5:
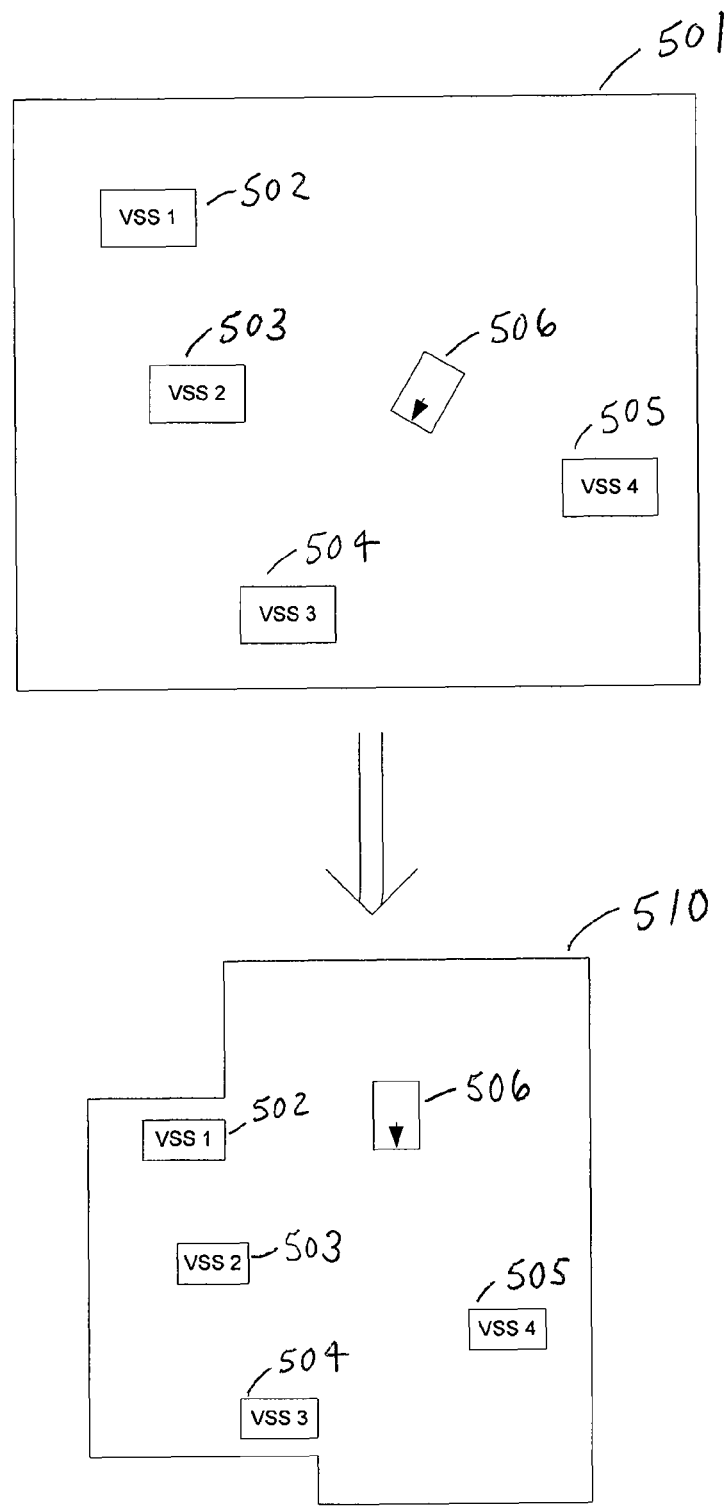
FIG. 5 is a diagram illustrating mapping of augmented reality audio content from one environment to another according to an exemplary embodiment of the present invention.

FIG. 5 shows a diagram illustrating mapping of augmented reality audio content from one environment to another according to an exemplary embodiment of the present invention. A first environment 501 may have one or more associated virtual sound sources 502-505 located in various positions in the first environment 501. An AR device 506 may modify audio content related to each of the virtual sound sources 502-505 based on a location of the AR device 506 in the environment 501. Should the AR device 506 travel to a new second environment 510, the AR device 506 may perform processing that maps the audio content of the various virtual sound sources 502-505 to the dimensions of the new second environment 510. In this regard, the AR device 506 may receive information regarding dimensions and a layout of the first environment 501 and the relative locations in the first environment 501 of each of the virtual sound sources 502-505. The AR device 506 may also obtain knowledge regarding the dimensions and layout of the new second environment 510 and process all of this information to perform the mapping of the virtual sound sources 502-505 to the second environment 510. Therefore, according to embodiments of the present invention, sound sources associated with a first environment may be mapped to a second environment should the augmented reality device move to the second environment.

Moreover, according to embodiments of the present invention, a user of the AR device may assign a location in a new environment to a sound in audio content obtained by the AR device. For example, the sound may be associated with a location in another environment where the user enters the new environment and assigns a location in the new environment to be the source of the sound. Alternatively, the sound may not be associated with any environment and the user enters an environment and assigns locations in the environment to sounds in audio content obtained by the AR device. This allows a user of the AR device to define locations for the sources of sounds in audio content.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for augmented reality enhanced audio comprising:
   obtaining audio content by a device from at least one of a source in the device or an external source located remotely from the device in an environment;
   determining, by the device, a location of the device with respect to the external source;
   moving the device through the environment to a different location;
   modifying, by the device, a loudness of the audio content based on a location of the device with respect to the external source, wherein the loudness of the audio content increases as the device approaches the external source;
   modifying, by the device, a left/right balance of the audio content based on an orientation of the device with respect to the external source, wherein the orientation of the device with respect to the external source includes at least one of an azimuth, an elevation, or a tilt of the device with respect to the external source; and
   outputting the modified audio content by the device.

2. The method according to claim 1, further comprising modifying the obtained audio content responsive to the moving the device to the different location and an orientation of the device at the different location; and
   outputting the modified audio content by the device.

3. The method according to claim 1, further comprising providing a central source that stores audio content associated with one or more external sources in the environment.

4. The method according to claim 1, further comprising obtaining audio content from at least one external source located one of within the environment or outside the environment.

5. The method according to claim 1, wherein the external source is a virtual sound source associated with a real object in the environment, and wherein a user of the device perceives that the modified audio content is being emitted from the real object.

6. The method according to claim 1, wherein the outputting further comprises:
   simultaneously outputting modified audio content associated with at least two external sources.

7. The method according to claim 6, further comprising the loudness of the sound varying based on the location of the device in the environment and the orientation of the device at the location.

8. The method according to claim 1, further comprising receiving at the device the audio content, information on an external source of at least one sound in the audio content, and a location of the external source of the at least one sound within the environment.

9. The method according to claim 1, wherein a user of the device determines at least one of a sound in the audio content, an external source of a sound in the audio content or a location of the external source of a sound within the environment.

10. The method according to claim 1, further comprising scaling audio content associated with a first environment to a second environment when the device is located in the second environment.

11. The method according to claim 1, further comprising receiving the audio content at the device upon the device entering the environment.

12. The method according to claim 1, further comprising the device assigning a location in a new environment to a source of a sound in the audio content obtained by the device.

13. A device for augmented reality enhanced audio comprising:
   a receiving module for obtaining audio content, wherein the device obtains audio content from at least one of a source in the device or an external source located remotely from the device in an environment;
   a location processing module, the location processing module being capable of receiving location information and determining a location of the device with respect to the external source in the environment;
   an orientation processing module, the orientation processing module being capable of determining an orientation of the device at the location with respect to the external source;
   a processor, the processor being capable of modifying a loudness of the audio content based on the location of the device with respect to the external source in the environment wherein the loudness of the audio content increases as the device approaches the external source, the processor additionally being capable of modifying a left/right balance of the audio content based on an orientation of the device at the location with respect to the external source, wherein the orientation of the device with respect to the external source includes at least one of an azimuth, an elevation, or a tilt of the device with respect to the external source; and
   an audio output device, the audio output device being capable of outputting the modified audio content,
   wherein the device moves through the environment comprising at least one external source.

14. The device according to claim 13, further comprising an input interface, the input interface being capable of receiving the audio content.

15. The device according to claim 13, further comprising a storage device, the storage device being capable of storing the audio content.

16. The device according to claim 13, wherein the device comprises one of a mobile phone, a computer, a personal digital assistant (PDA), an electronic game device, or an audio device.

17. The device according to claim 13, wherein the location information comprises at least one of GPS coordinates of the location of the device, a distance of the device from the external source, position information of the device, or triangulation information of the device.

18. The device according to claim 13, wherein the audio output device is capable of simultaneously outputting modified audio content associated with at least two external sources.

19. The device according to claim 13, wherein the audio output device comprises at least one of a headset, earplugs, or at least one speaker.

20. The method according to claim 10, wherein first dimensions associated with the first environment are different from second dimensions associated with the second environment.

* * * * *